(12) United States Patent
Yang

(10) Patent No.: US 7,658,846 B1
(45) Date of Patent: Feb. 9, 2010

(54) STRUCTURE OF WATER FILTER ASSEMBLY

(76) Inventor: Chih-Sheng Yang, P.O. Box 44-2049, Tainan County (TW) 10668

(*) Notice: Subject to any disclaimer, the term of this patent is extended or adjusted under 35 U.S.C. 154(b) by 0 days.

(21) Appl. No.: 12/289,560

(22) Filed: Oct. 30, 2008

(51) Int. Cl.
B01D 27/08 (2006.01)
B01D 27/14 (2006.01)
B01D 35/30 (2006.01)
B01D 35/34 (2006.01)

(52) U.S. Cl. .............. 210/232; 210/237; 210/238; 210/323.2; 210/335; 210/446; 210/447

(58) Field of Classification Search ........... 210/232, 210/237, 238, 323.2, 35, 446, 447
See application file for complete search history.

(56) References Cited

U.S. PATENT DOCUMENTS 1,798,708 A * 3/1931 Smith .................. 222/530
5,049,270 A * 9/1991 Carrano et al. .......... 210/248
2007/0199875 A1* 8/2007 Moorey et al. .......... 210/206

* cited by examiner

Primary Examiner—Thomas M Lithgow
(74) Attorney, Agent, or Firm—C. G. Mersereau; Nikolai & Mersereau, P.A.

(57) ABSTRACT

A water filter assembly includes an upper cover body, a lower base, and a plurality of filter cores. The upper cover body is formed with a connector extending downwards. The connector is to be connected to a filter core set, which includes the filter cores connected together and has output and input hoses. The lower base has a chamber for accommodating the filter core set and has a cover portion connected to the upper cover body. Positioning members are formed on the output and input hoses at suitable positions. Notches are formed on two sides of the cover portion of the lower base so that the positioning members may engage with the notches.

3 Claims, 6 Drawing Sheets

STRUCTURE OF WATER FILTER ASSEMBLY

BACKGROUND OF THE INVENTION (1) Field of the Invention

The invention relates to an improved structure of a water filter assembly, and more particularly to a water filter for filtering water, wherein a water outlet and a water inlet can be firmly fixed, and the assembling directions of the water outlet and inlet can be changed.

(2) Description of the Prior Art

FIG. 1 shows a typical water filter 1. The water filter 1 has a base 11, which may be hung or placed horizontally. The base 11 has at least one connector 12, which is connected to a filter core set 13 composed of a plurality of filter cores connected together. The filter core set 13 has an input hose 131 and an output hose 132. The input hose 131 and the output hose 132 project out of the water filter 1 via through holes 111 of the base 11 so that the input hose 131 may be connected to a water faucet A and the output hose 132 is connected to an output faucet B.

When the water filter 1 is being used, the water faucet A is opened, and the water enters the filter core set 13 via the input hose 131 and then is filtered. The filtered water is then supplied to the output faucet B via the output hose 132 so that the filtered water can be used.

However, the through holes 111 of the base 11 of the water filter cannot effectively position the output and input hoses. Thus, the user may often carelessly break the hoses or damage the filter core set 13. In addition, the directions of the water outlet and inlet of the water filter are also limited by the direction of the filter core set and cannot be changed according to the user's requirement.

SUMMARY OF THE INVENTION

In view of this, the invention provides a water filter assembly including an upper cover body, a lower base, and a plurality of filter cores. The upper cover body is formed with a connector extending downwards. The connector is to be connected to a filter core set, which includes the filter cores connected together and has output and input hoses. The lower base has a chamber for accommodating the filter core set and has a cover portion connected to the upper cover body. Positioning members are formed on the output and input hoses at suitable positions. Notches are formed on two sides of the cover portion of the lower base so that the positioning members may engage with the notches.

Thus, the positioning members are engaged with the notches on two sides of the lower base so that the water outlet and inlet may be firmly fixed. In addition, the filter core set may be combined with the upper cover body and the two sides of the lower base are formed with notches. So, the user can lift up the upper cover body and rotate the upper cover body to the opposite direction so that the directions of the water outlet and inlet of the water filter can be easily changed.

Further aspects, objects, and desirable features of the invention will be better understood from the detailed description and drawings that follow in which various embodiments of the disclosed invention are illustrated by way of examples.

DETAILED DESCRIPTION OF THE PREFERRED EMBODIMENTS

Figure 1:
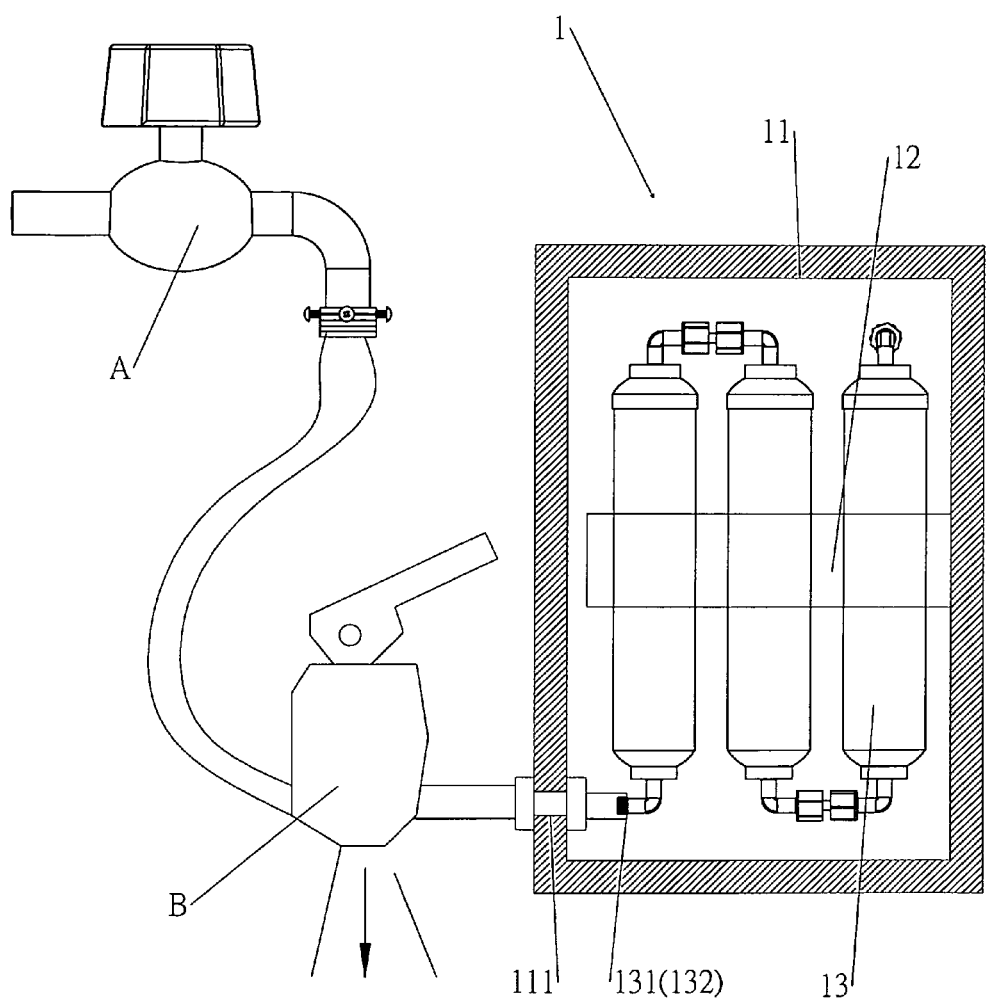
FIG. 1 is a schematic illustration showing a structure of a conventional water filter.
Figure 2:
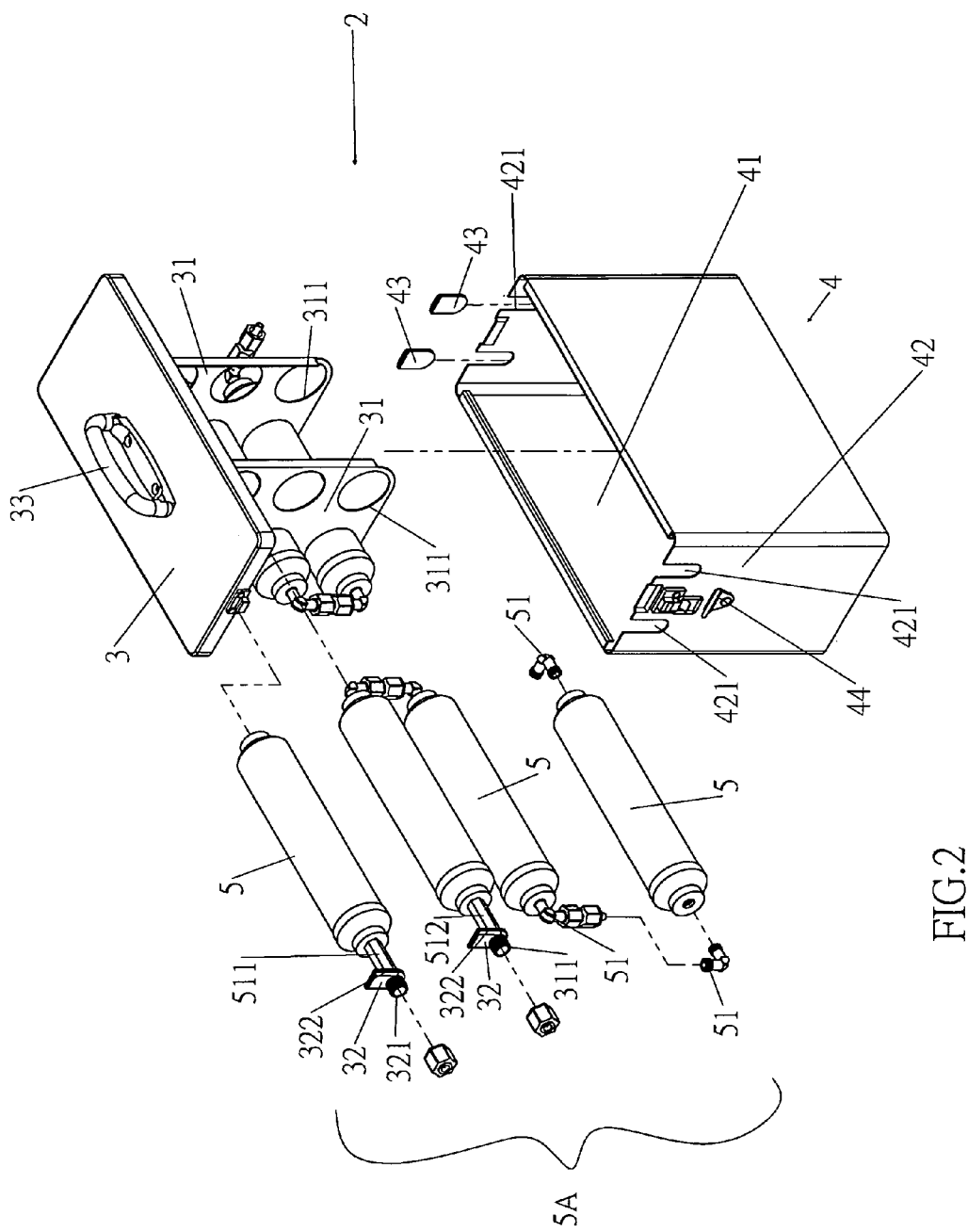
FIG. 2 is an exploded perspective view showing a water filter assembly of the invention.
Figure 3:
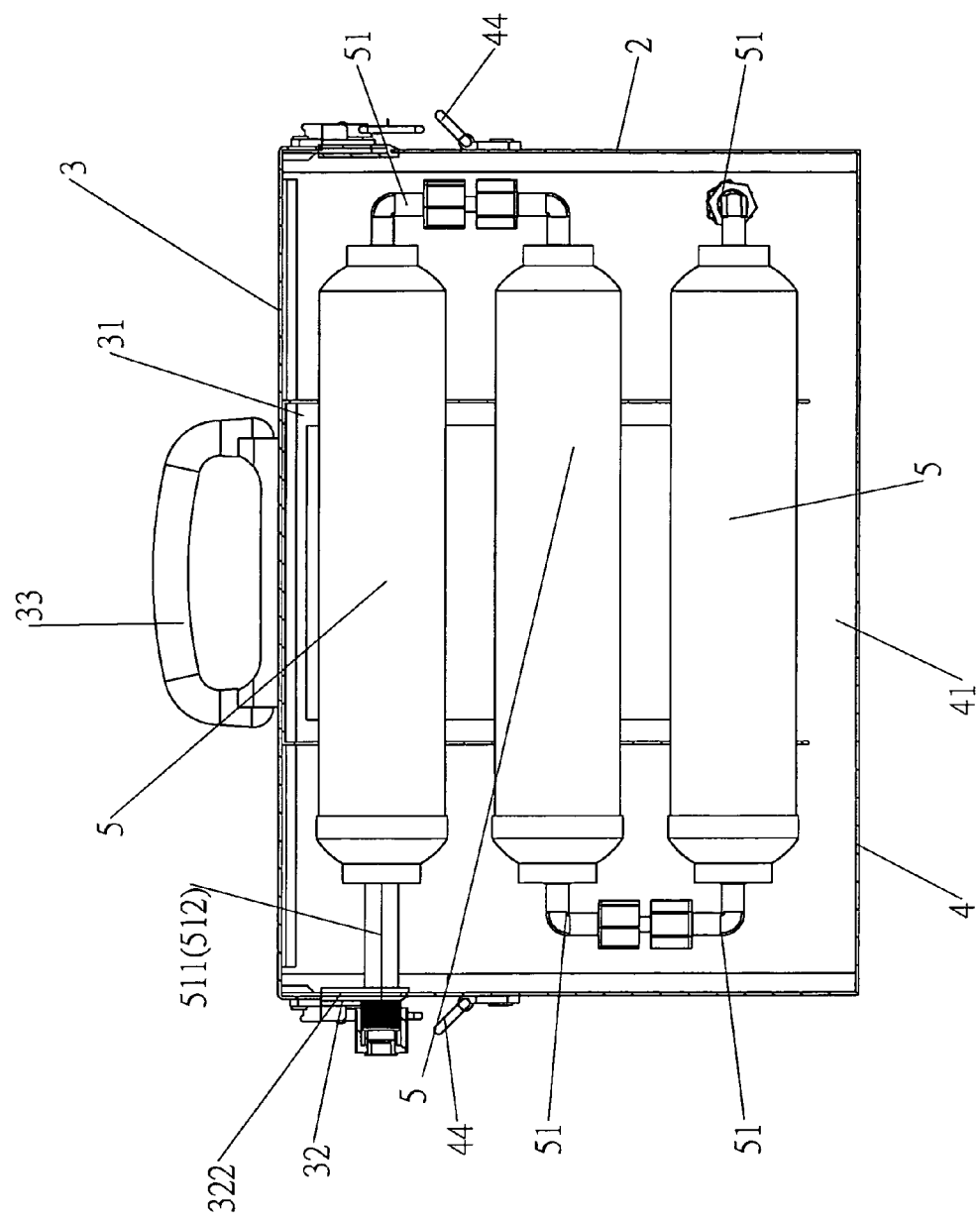
FIG. 3 is an assembled cross-sectional view showing the water filter assembly of the invention.
Figure 4:
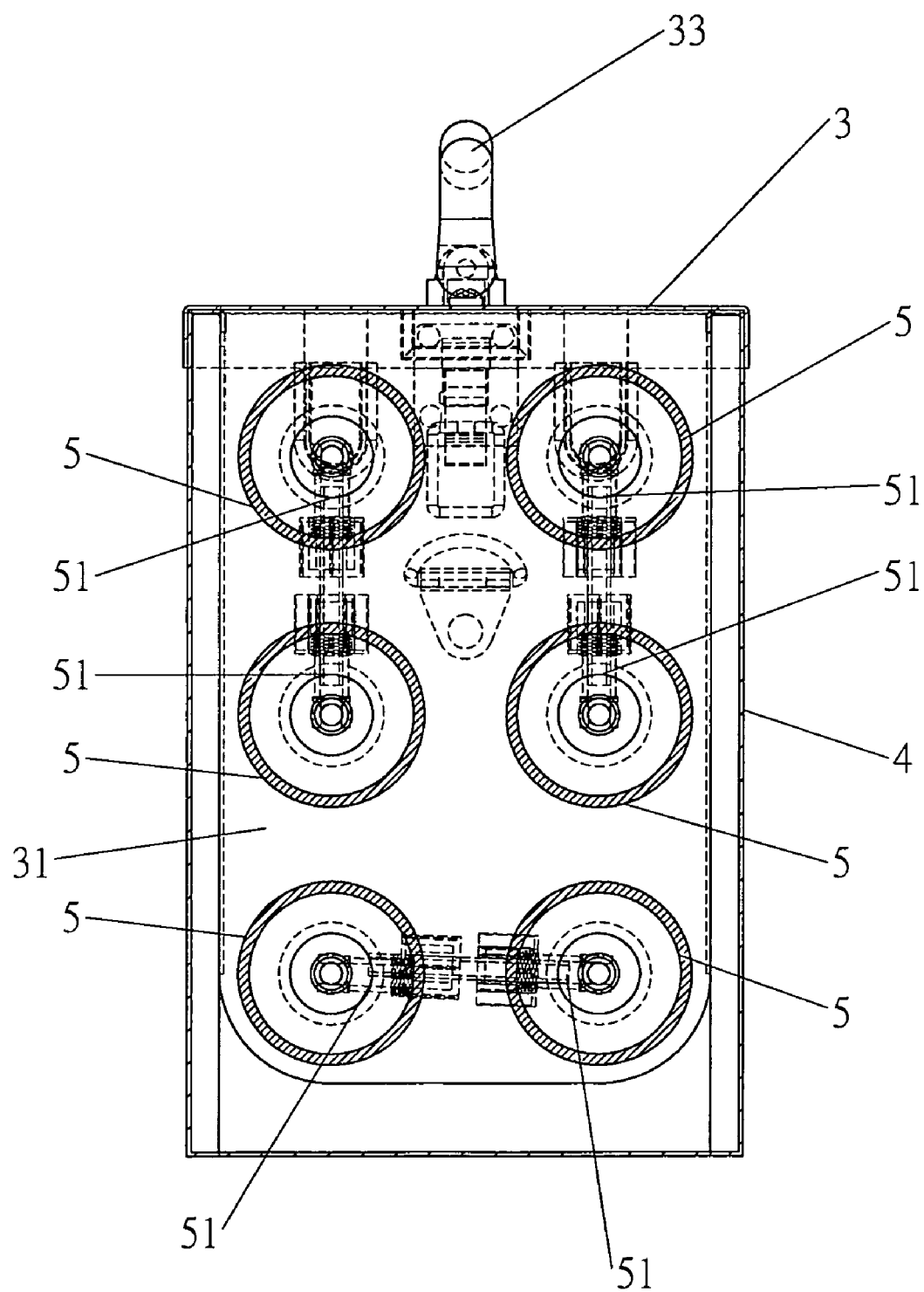
FIG. 4 is a partially enlarged cross-sectional view showing the water filter assembly of FIG. 3.

FIGS. 2 to 4 are an exploded perspective view, an assembled cross-sectional view and a partially enlarged cross-sectional view showing a water filter assembly of the invention, respectively. The water filter 2 includes an upper cover body 3, a lower base 4 and a plurality of filter cores 5.

The upper cover body 3 is formed with a connector 31 or connectors 31 extending downwards, and the connector 31 is formed with a plurality of accommodating holes 311 for accommodating the filter cores 5.

The filter cores 5 are connected together through connector tubes 51 to constitute a filter core set 5A. The filter core set 5A has an input hose 511 and an output hose 512. Positioning members 32 are disposed at suitable positions of the output hose 512 and the input hose 511, and the positioning members 32 have grooves 322.

The lower base 4 is formed with a chamber 41 for accommodating the filter core set 5A, and formed with a cover portion 42 connected to the upper cover body 3. The cover portion 42 is formed with one notch 421 or a plurality of notches 421 on two sides of the cover portion 42.

During assembling, the filter cores 5 are fit with the accommodating holes 311 of the connector 31 of the upper cover body 3, and the filter cores 5 are connected to form the filter core set 5A through the connector tubes 51. The filter core set 5A is formed with the input hose 511 and the output hose 512. A through hole 321 penetrates through the positioning member 32. Then, the upper cover body 3 and the lower base 4 are closed. During closing, the grooves 322 of the positioning members 32 corresponding to the input hose 511 and the output hose 512 are embedded with the notches 421 of the cover portion 42 of the lower base 4. The water outlet and inlet may be firmly fixed onto the casing of the water filter 2.

Figure 5:
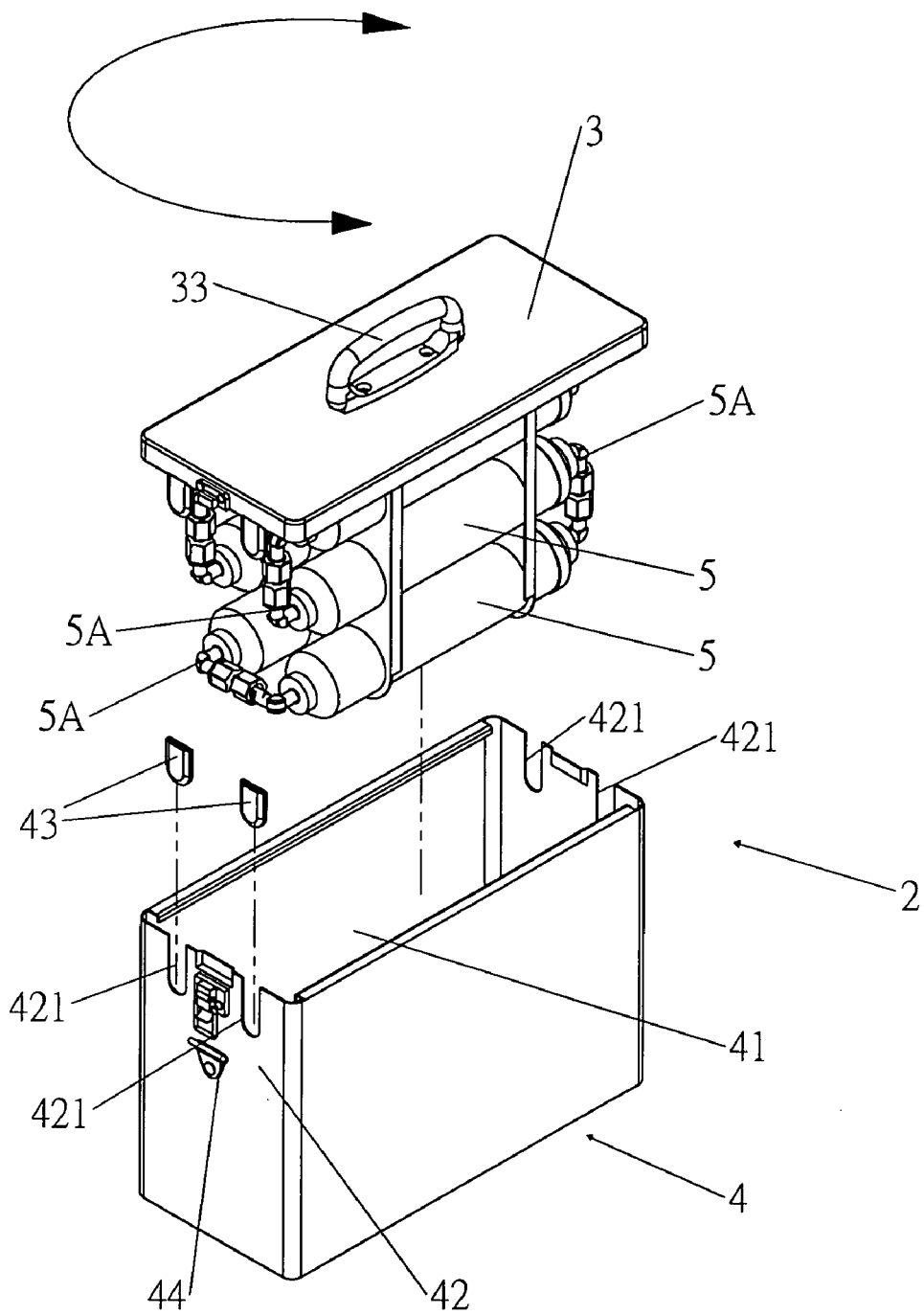
FIG. 5 is a schematic illustration showing an embodiment of the invention.

As shown in FIG. 5, a handle 33 may be formed on an outer side of the upper cover body 3, and the lower base 4 may further be formed with a closing member 43. When the directions of the water outlet and inlet of the water filter 2 are to be changed, it is only necessary to pull up the handle 33 to separate the upper cover body 3 from the lower base 4, and then to remove the closing member 43 of the lower base 4. Thereafter, the upper cover body 3 or the lower base 4 is rotated to an opposite direction. Then, the upper cover body 3 and the lower base 4 are closed. Thus, the directions of the water outlet and inlet can be easily changed, and the closing member 43 may also isolate the external contamination from the notches 421 of the lower base 4.

Figure 6:
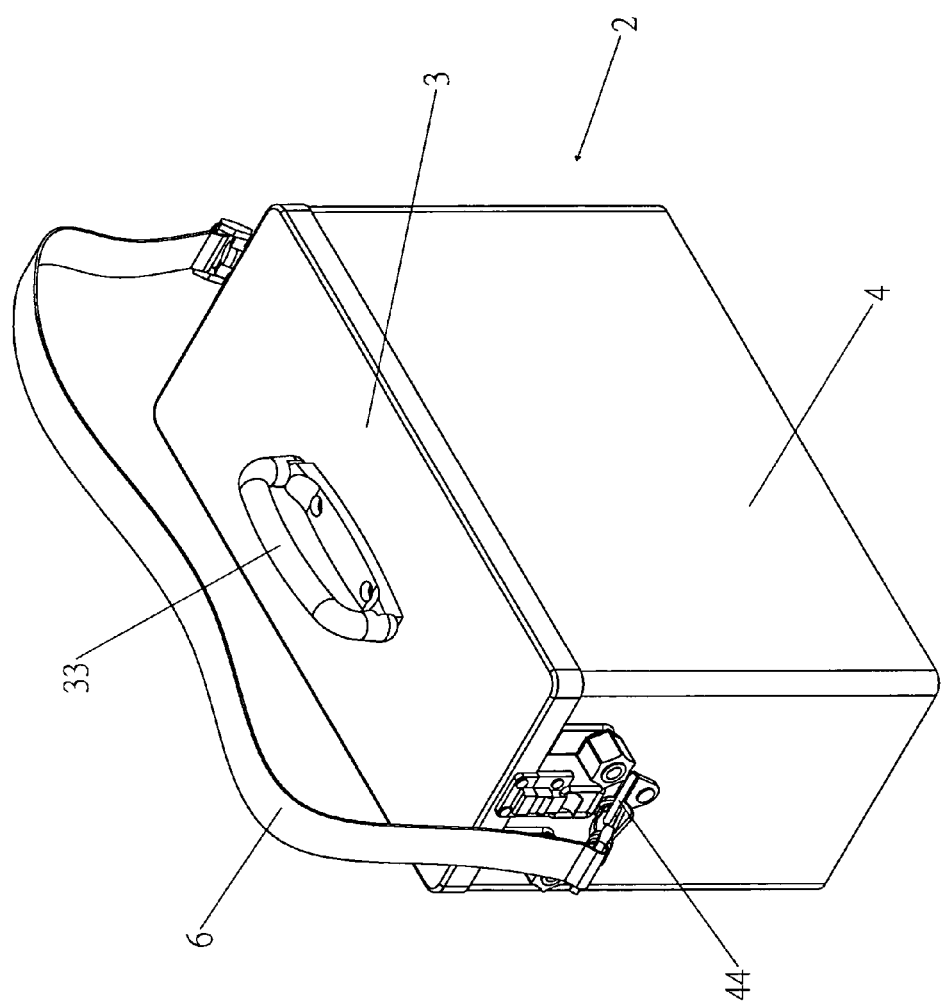
FIG. 6 is a schematic illustration showing another embodiment of the invention.

As shown in FIG. 6, an outer side of the lower base 4 may be formed with a buckle 44 for buckling up a shoulder strap 6 so that a portable water filter is obtained.

Thus, the invention has the following advantages.

First, the positioning members are disposed on the hoses at the water outlet and inlet of the water filter and may be fixed to the casing of the filter. Thus, the output and input hoses can be firmly fixed, and the lifetimes of the hoses can be lengthened. In addition, it is possible to prevent the high water pressure from causing the hoses to move randomly and thus to prevent the water from being wasted.

Second, the filter core set of the water filter is combined with the upper cover body. When the directions of the water outlet and inlet are to be changed, it is only necessary to pull up the upper cover body and rotate the upper cover body to the opposite direction. So, the directions can be changed according to the user's requirements in various occasions. Thus, it is unnecessary to purchase another water filter.

In summary, the water filter assembly of the invention is new and can be applied to the industry with the inventive step.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. A water filter assembly comprising an upper cover body, a lower base, and a plurality of filter cores, wherein:

the upper cover body is formed with a connector extending downwards and the connector has a plurality of accommodating holes;

the connector is to be connected to a filter core set, which comprises the filter cores connected together and has output and input hoses, the filter cores are engaged with the accommodating holes of the connector;

the lower base has a chamber for accommodating the filter core set and has a cover portion connected to the upper cover body;

positioning members are formed on the output and input hoses and have grooves; and notches are formed on two sides of the cover portion of the lower base and the positioning members are engaged with the notches by the grooves thereof, closing members are disposed at the notches that do not have the positioning members engaged therewith.

2. The water filter assembly according to claim 1, wherein the lower base has a buckle for buckling up a shoulder strap.

3. The water filter assembly according to claim 1, wherein a handle is mounted on an outer side of the upper cover body.

* * * * *